(12) United States Patent
Nakamura et al.

(10) Patent No.: US 7,924,273 B2
(45) Date of Patent: Apr. 12, 2011

(54) DISPLAY APPARATUS WITH OPTICAL INPUT FUNCTION

(75) Inventors: Hiroki Nakamura, Ageo (JP); Takashi Nakamura, Saitama (JP); Hirotaka Hayashi, Fukaya (JP); Norio Tada, Kumagaya (JP); Takayuki Imai, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 755 days.

(21) Appl. No.: 11/868,126

(22) Filed: Oct. 5, 2007

(65) Prior Publication Data

US 2008/0252617 A1 Oct. 16, 2008

(30) Foreign Application Priority Data

Nov. 6, 2006 (JP) ................................ 2006-300533
Nov. 30, 2006 (JP) ................................ 2006-324446

(51) Int. Cl.
*G06F 3/042* (2006.01)
(52) U.S. Cl. ........ 345/175; 345/173; 345/174; 382/274; 382/275
(58) Field of Classification Search ............... 345/102, 345/173–175; 348/274, 275
See application file for complete search history.

(56) References Cited

U.S. PATENT DOCUMENTS

| 5,483,261 | A  | * | 1/1996  | Yasutake ................... 345/173 |
| 6,292,173 | B1 | * | 9/2001  | Rambaldi et al. ............. 345/157 |
| 2004/0008172 | A1 |   | 1/2004  | Nakamura et al. |
| 2005/0275616 | A1 | * | 12/2005 | Park et al. ..................... 345/102 |
| 2006/0017706 | A1 | * | 1/2006  | Cutherell et al. ............. 345/173 |
| 2006/0279557 | A1 | * | 12/2006 | Gettemy ....................... 345/175 |

FOREIGN PATENT DOCUMENTS

| JP | 2001-292276 | 10/2001 |
| JP | 2001-339640 | 12/2001 |
| JP | 2005-327106 | 11/2005 |

OTHER PUBLICATIONS

U.S. Appl. No. 11/695,239, filed Apr. 2, 2007, Nakamura, et al.
U.S. Appl. No. 12/026,814, filed Feb. 6, 2008, Nakamura, et al.

* cited by examiner

*Primary Examiner* — Amare Mengistu
*Assistant Examiner* — Koosha Sharifi
(74) *Attorney, Agent, or Firm* — Oblon, Spivak, McClelland, Maier & Neustadt, L.L.P.

(57) ABSTRACT

In making a contact determination between an object and a display screen, a display apparatus of the present invention is capable of adjusting a region on which to make a contact determination in response to the displayed image in a liquid crystal panel, so that the influence by the displayed image can be suppressed. Moreover, for simplifying the contact determination process, the display apparatus sets solid a region in the picked-up image that is not a target of the contact determination, with a predetermined gradation value.

1 Claim, 9 Drawing Sheets

61

62

DISPLAY APPARATUS WITH OPTICAL INPUT FUNCTION

CROSS REFERENCE TO RELATED APPLICATIONS

This application is based upon and claims the benefit of priority from Japanese Patent Applications No. 2006-300533 filed on Nov. 6, 2006; and No. 2006-324446 filed on Nov. 30, 2006, the entire contents of which are incorporated herein by reference.

BACKGROUND OF THE INVENTION

1. Field of the Invention

The present invention relates to a display apparatus provided with an optical input function, that is, a display apparatus capable of receiving input of information through its display screen by use of light.

2. Description of the Related Art

Generally, liquid crystal display apparatuses are widely used as a display apparatus for cellular phones, laptop computers and the like.

In recent years, techniques have been proposed for providing optical sensors discretely on a display screen of a liquid crystal display apparatus. A liquid crystal display apparatus of this type is capable of receiving input of an image through its display screen by use of an optical sensor. Examples of the technique for receiving input of an image through a display screen are disclosed in Japanese Patent Application Laid-open Publication No. 2001-292276, Japanese Patent Application Laid-open Publication No. 2001-339640 and Japanese Patent Application Laid-open Publication No. 2005-327106. Proposed in these documents is an optical touch-panel for detecting a position of and contact by a finger, by use of an image received through the display screen.

Hereinafter, descriptions will be provided for an image picked up through a display screen. In a displayed image shown in FIG. 1, an image 101 is displayed in an upper portion, and key icons 102 are displayed in the lower portion thereof. A display apparatus that displays the image in FIG. 1 determines on whether or not a contact occurs between a pointing object 103 and the display screen, in the lower portion of the display screen (hereinbelow, simply referred to as a "contact determination").

A light beam emitted from a backlight passes through a liquid crystal layer, polarizers and displays the image on the display screen. Some of the light beams reflect on an interface of the polarizers or on a protective acrylic screen disposed on a surface of the liquid crystal panel, and then enter an optical sensor. When an image is picked up in ambient light of low illuminance as can be seen in a picked-up image in FIG. 2, in some cases, brightness and darkness of the displayed image are reflected in the picked-up image. In the case where the brightness and darkness of the displayed image are reflected in the picked-up image, an error input may occur by the display apparatus wrongly recognizing that a position different from the original position of the pointing object 103 is the coordinate of contact point.

SUMMARY OF THE INVENTION

An object of the present invention is to avoid influence from the illuminance of ambient light in order to make a precise contact determination by a display apparatus with an optical input function.

The display apparatus according to a first aspect of the present invention includes a display unit, a plurality of optical input units, a convert unit, a designation unit and a process unit. The display unit displays an image having a part that an object is supposed to contact. The convert unit receives electric signals each in a magnitude corresponding to an amount of received light, from each optical input units and convert the signals into gradation values to obtain a picked-up image. The designation unit designates an area in the picked-up image for processing the image, in accordance with the displayed image. The process unit finds a coordinate of the object, in accordance with data within the area.

In the present invention, the area for processing is set depending on the displayed image. In this way, it is possible to prevent an error in the contact determination due to the displayed image being reflected in the picked-up image.

The display apparatus according to a second aspect of the present invention includes a measurement unit for detecting the intensity of ambient light. For this reason, the method for contact determination can be selected depending on the intensity of ambient light, and deal with a broader range of ambient light.

DESCRIPTION OF THE EMBODIMENT

First Embodiment

Figure 1:
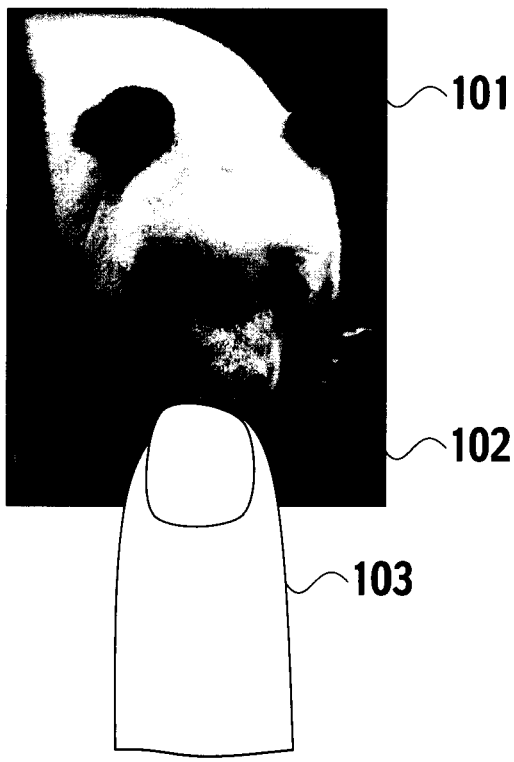
FIG. 1 is a plan view showing a displayed image and an object to be picked up.
Figure 2:
FIG. 2 is a picked-up image of the above-mentioned target object, picked up in ambient light of low illuminance.
Figure 3:
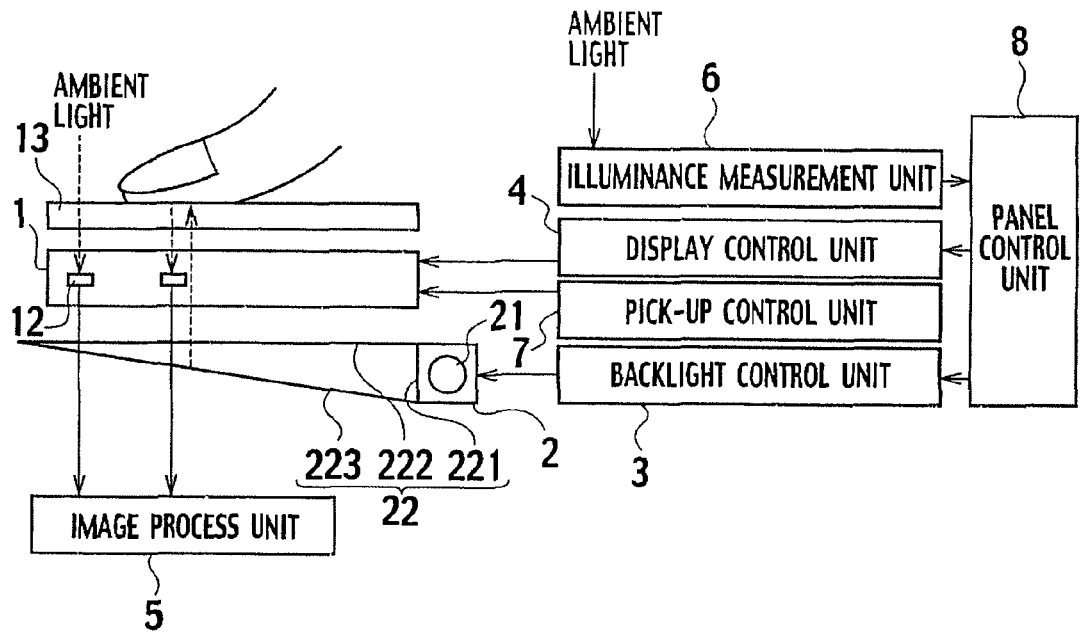
FIG. 3 shows a configuration of a display apparatus according to a first embodiment.

As shown in FIG. 3, a display apparatus of a first embodiment includes: a liquid crystal display 1; a backlight 2; a backlight control unit 3; a display control unit 4; an image process unit 5; an illuminance measurement unit 6; a pick-up control unit 7; and a liquid crystal panel control unit 8. A protective screen 13 is adhered to a surface of the liquid crystal panel 1. The backlight 2 is disposed on the back surface of the liquid crystal panel 1. The backlight control unit 3, the display control unit 4, the image process unit 5, the illuminance measurement unit 6, the pick-up control unit 7 and the liquid-crystal panel control unit 8 are integrated (into an IC) in an outer portion of the liquid crystal panel 1. These units may alternatively be integrated on the liquid crystal panel 1 by use of the polysilicon TFT technology. Hereinafter, detailed descriptions will be provided for each of the units.

Figure 4:
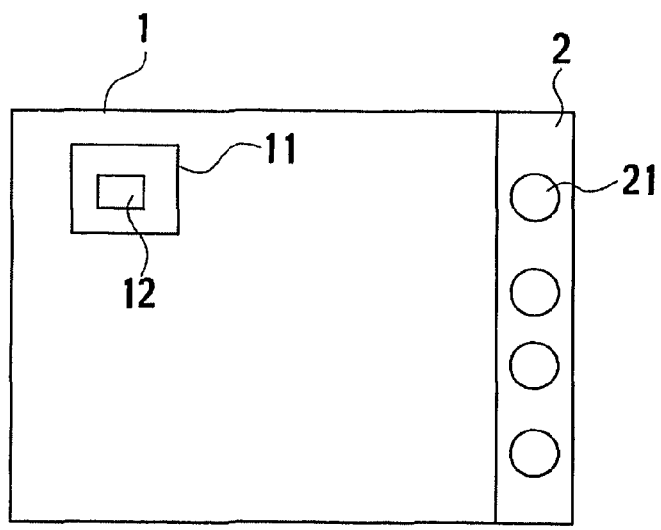
FIG. 4 is a plan view showing the configuration of the display apparatus of the above embodiment.

As can be seen in FIG. 4, the liquid crystal panel 1 includes a plurality of display elements 11 and sensing elements 12 formed in the display elements 11. The liquid crystal panel 1 displays an image through the display elements 11, and also detects an amount of received light by use of the sensing elements 12. Specifically, received light includes ambient light entering the image screen, and light reflected on the protective screen 13. Incidentally, the sensing element 12 is not necessarily formed in every one of the display elements 11. One sensing element 12 may be formed for every three display elements 11, for example. The sensing element 12 outputs electric signals each in a magnitude corresponding to the detected amount of received light.

The backlight 2 includes a light source 21 and a light guiding plate 22, and emits light to the liquid crystal panel 1. White LED is used as the light source 21. In order that emitted light beams enter the light guiding plate 22 efficiently, the light source 21 is covered with a reflector composed of a high-reflectance white resin sheet. The light guiding plate 22 is formed of resin with a high refractive index (polycarbonate resin or methacrylic resin, for example). The light guiding plate 22 is formed of an incident surface 221, an outgoing surface 222 and a counter surface 223 that is formed to face the outgoing surface 222 in an inclined manner. A light beam that enters from the incident surface 221 repeats total reflection between the incident surface 222 and the counter surface 223 while traveling through the light guiding plate 22, and is eventually emitted from the outgoing surface 222. In order for the light beams to be emitted uniformly, a diffuse reflection layer and reflection channel of a specific density distribution and size are formed in the incident surface 222 and the counter surface 223.

The backlight control unit 3 controls the intensity of light beams emitted from the light source 21. In a case where the intensity of ambient light is low, the intensity of an emitted light beam is lowered so that light reflection on the protective screen 13 can be suppressed. Thus, the displayed image can be kept from being reflected in the picked-up image.

The display control unit 4 sets the voltage of pixel electrodes through a drive circuit formed on the liquid crystal display 1. By controlling the voltage of the pixel electrodes, the display control unit 4 causes the field intensity between the pixel electrodes and common electrodes to change in the liquid crystal layer. Thus, the transmissivity of the liquid crystal layer is set. By setting the transmissivity for each of display apparatuses 11 separately, it is possible to obtain a transmissivity distribution corresponding to the content of the displayed image.

The image process unit 5 receives, from the sensing elements 12, electric signals in a magnitude each corresponding to the amount of received light. The image process unit 5 converts the electric signals into gradation values to obtain a picked-up image of an object adjacent to the display screen. According to the picked-up image, the image process unit 5 calculates a position coordinate of the adjacent object, and makes a contact determination between this object and the display screen. In making the contact determination, the image process unit 5 changes the area in which to process the picked-up image, according to the image displayed on the liquid crystal panel 1. In this way, when a displayed image is reflected in a picked-up image, influences of the displayed image thus reflected on the calculation of coordinates and on the contact determination can be reduced. Hence, the coordinate of the contact point of the object can be determined more accurately. Detailed descriptions of the specific operations for picking up an image and for contact determination will be provided later.

The illuminance measurement unit 6 measures the intensity of ambient light. By varying the method for detecting the contact coordinate in accordance with the intensity of ambient, the contact coordinate can be detected in both of places where ambient light has high intensity and where ambient light has low intensity. The intensity of ambient light may be measured by use of an optical sensor for illuminance measurement, or by finding a numeric value corresponding to the intensity of ambient light in a picked-up image. In the case of using the picked-up image, it is preferable to employ the measured value within the area designated in the image process unit 5.

The pick-up control unit 7 controls the exposure time and pre-charge time of the sensing elements 12. For an optimal pick up of images in ambient light of both high and low illuminance, it is desirable that the exposure time and pre-charge time of the sensing elements 12 be controlled by the pick-up control unit 7 in accordance with the illuminance of ambient light.

The liquid-crystal panel control unit 8 controls the display control unit 4 and the backlight control unit 3 according to the intensity of ambient light. In this way, the liquid-crystal panel control unit 8 adjusts the brightness of an image displayed in the liquid crystal panel 1.

Figure 5:
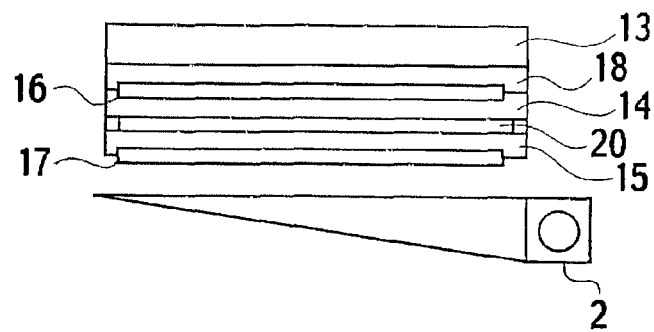
FIG. 5 is a cross-sectional view showing the configuration of the display apparatus of the above embodiment.

As can be seen in FIG. 5, the liquid crystal panel 1 includes a liquid crystal layer 20, a counter substrate 14, an array substrate 15 and polarizers 16 and 17. The liquid crystal layer 20 is disposed so as to be sandwiched between the counter substrate 14 and the array substrate 15. The polarizers 16 and 17 are disposed on the outer sides of the counter substrate 14 and the array substrate 15, respectively. The protective screen 13 is adhered to the polarizer 16 disposed on an outer side of the counter substrate 14, by an adhesive agent 18. For suppressing reflection in the interface, a member with approximately the same refractive index as the protective screen (such as photocurable resin adhesive) may be used for the adhesive agent 18. In this way, reflection is suppressed in the interface on the liquid crystal layer 20-side of the protective screen 13, so that the displayed image on the display screen is prevented from being reflected in the picked-up image.

Figure 6:
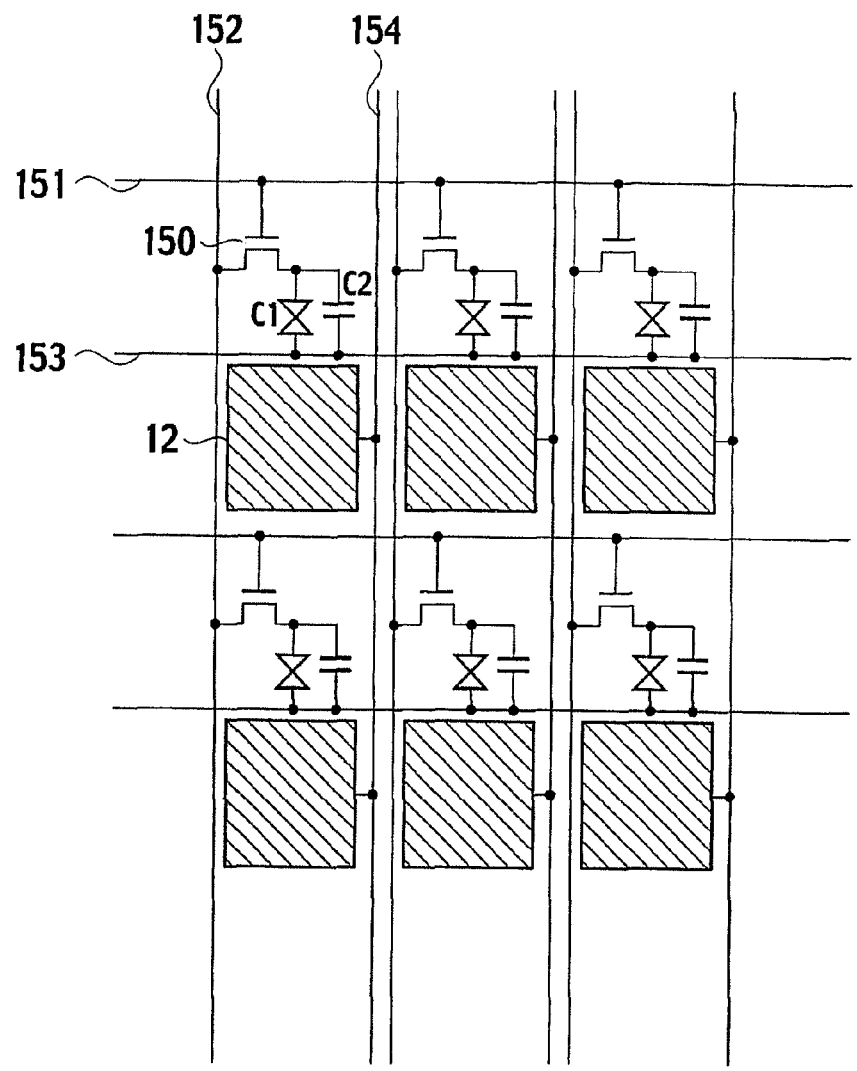
FIG. 6 is a circuit diagram showing a configuration of an array substrate of the display apparatus of the above embodiment.

As can be seen in FIG. 6, wirings of a plurality of scan lines 151 and signal lines 152 are arranged in a matrix form on the array substrate 15. A pixel TFT 150 is disposed in the intersection of the scan line 151 and the signal line 152. A liquid crystal capacitor C1 and an auxiliary capacitor C2 are connected to the pixel TFT 150 to configure a single display element 11. Other terminals of the liquid crystal capacitor C1 and auxiliary capacitor C2 are connected to an auxiliary capacitor line 153. An image signal is applied to the signal line 152, and a scan signal is applied to the scan line 151 by a drive circuit (not shown) formed on the array substrate 15. Upon application of the scan signal on the scan line 151, the pixel TFT 150 is turned on, and the image signal applied to the signal line 152 is written into the liquid crystal capacitor C1 and auxiliary capacitor C2.

The sensing element 12 is formed in each of the display elements 11. The sensing element 12 outputs, to the image process unit 5, electric signals each in a magnitude corresponding to the detected amount of received light via a data line 154. The sensing element 12 is configured of: an optical sensor (not shown) for receiving an entering light beam and then converting the beam into an electric signal; a sensor capacitor (not shown) for accumulating therein electrical charge corresponding to the received amount of light; a switching device (not shown) for controlling whether or not to output, to the data line 154, signals according to the electrical charge accumulated in the sensor capacitor; and the like. A photodiode may be used as the optical sensor. Incidentally, a pixel is formed of colors such as red, green and blue. The sensing element 12 is not necessarily formed on every pixel, and one sensing element 12 may be formed for every three pixels, for example. Moreover, by controlling the flow timings of electric signals corresponding to the image signals and the amount of received light, the signal line 152 may be used as the data line 154.

Figure 7:
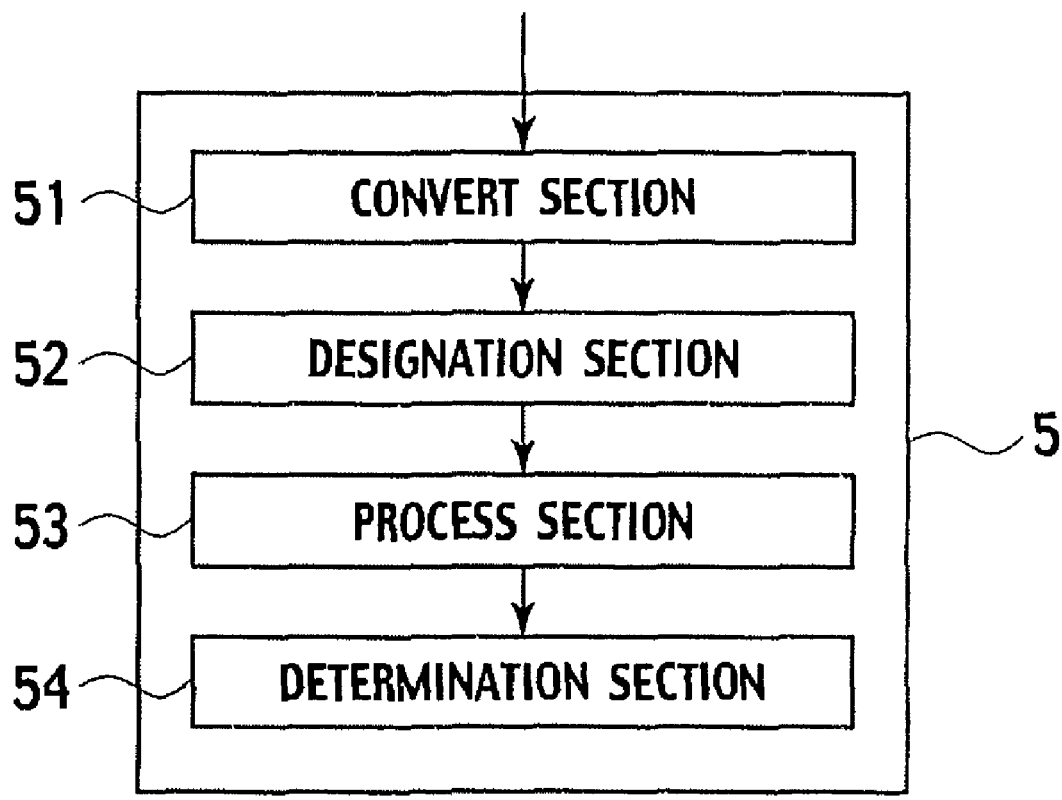
FIG. 7 is a plan view showing a configuration of an image process unit of the display apparatus of the above embodiment.

Next, descriptions will be provided for the contact determination made by the image process unit 5. As can be seen in FIG. 7, the image process unit 5 includes a convert section 51, a designation section 52, a process section 53 and a determination section 54. The convert section 51 receives, from the sensing elements 12, electric signals each in a magnitude, corresponding to the amount of received light. Then, the convert section 51 converts the received signals into gradation values to obtain a picked-up image. The designation section 52 designates an area out of the picked-up image, in which to make a contact determination. The process section 53 processes the designated area of the picked-up image to obtain images such as an edge image and a difference image. At this time, when the illuminance of ambient light is low, the process is executed only on the parts corresponding to the image within the area of the contact determination. The determination section 54 makes a contact determination between the object and the display screen by detecting variations in brightness and darkness, form and so forth in reference to the obtained edge images, difference images.

Descriptions will be provided below, for an influence that the intensity of ambient light has on the picked-up image. A picked-up image of an object adjacent to a liquid crystal panel 1 can be obtained by converting the electric signals into gradation values, the electric signals in a magnitude corresponding to the detected amount of light received in the sensing elements 12. In the sensing element 12, the intensity of ambient light that has not been shielded by the object, or the intensity of light beams emitted from the liquid crystal panel 1 and then reflected on the object, is detected.

Figure 8:
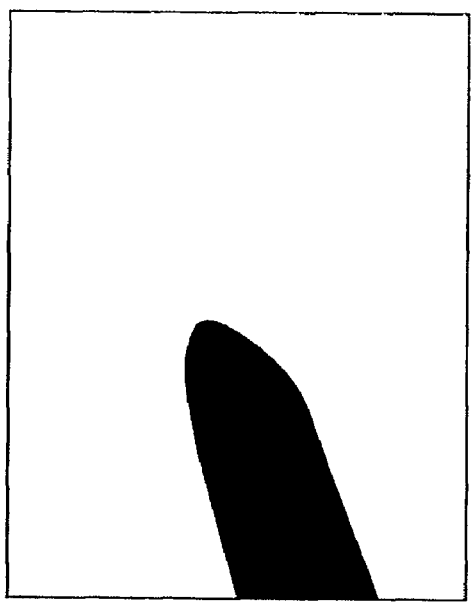
FIG. 8 is a picked-up image of a finger adjacent to a liquid crystal panel, in ambient light of high illuminance.
Figure 9:
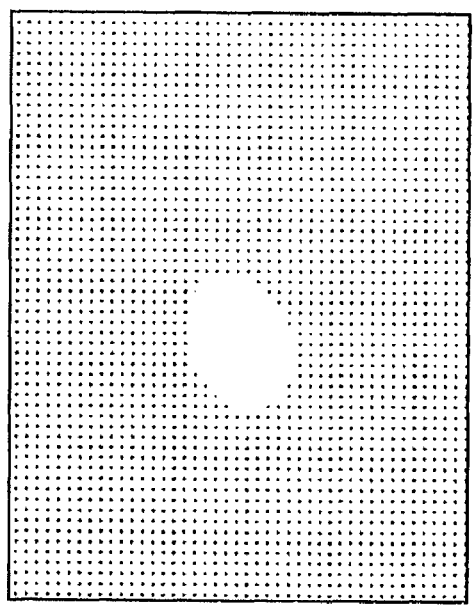
FIG. 9 is a picked-up image of the finger adjacent to the liquid crystal panel, in ambient light of low illuminance.

When the intensity of ambient light is high, the amount of received light that is not shielded by the finger is large, and the amount of received light shielded by the finger is small. Accordingly, as can be seen in FIG. 8, an image is obtained where a part corresponding to the finger adjacent to the display screen is extremely dark as a shadow, and other parts are bright. On the other hand, when the intensity of ambient light is low, the amount of received light is large in a part where light beams reflected on the finger are received, and the amount of received light is small in other parts. Accordingly, as can be seen in FIG. 9, an image is obtained in which the part contacted by the finger on the liquid crystal panel 1 is extremely bright, and other parts have medium brightness. This is because some of the light beams emitted from the display screen reflect on the contacted finger or the like.

In this respect, in a case where the intensity of ambient light is high, the coordinate of contact point is detected by finding a barycentric coordinate of the shadow caused by the finger shielding the ambient light. Meanwhile, in a case where the intensity of ambient light is low, the coordinate of contact point is detected by finding a barycentric coordinate of the part brightened by the light reflected on the finger, originally having been emitted from the display screen. Thus, by varying the method for detecting the coordinate of contact point in response to the measured intensity of ambient light, the contact determination can be made in a broader range of intensity of ambient light.

Figure 10A:
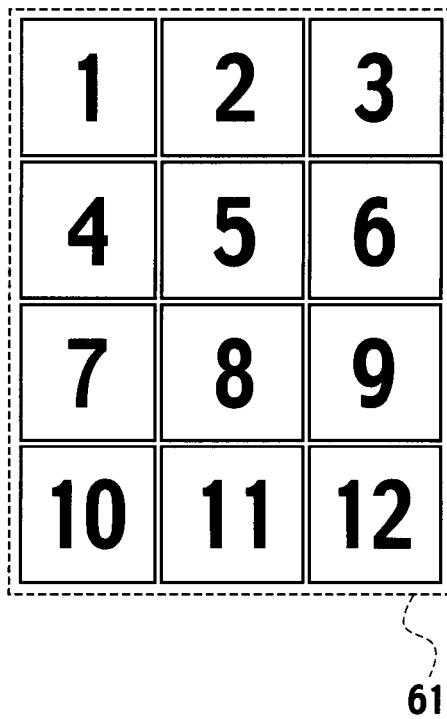
FIGS. 10A and 10B are views showing regions in which to make a contact determination.
Figure 10B:

Next, descriptions will be provided for a displayed image and the area set in accordance with the image, the area being the target for the contact determination process. When any one of the key icons in the image shown in FIG. 10A is contacted, the displayed image changes according to the contacted key icon, as can be seen in FIG. 10B. When any one of the arrow icons in the image shown in FIG. 10B is contacted, the image displayed in the upper portion of the display changes. When the menu icon in the image shown in FIG. 10B is contacted, the displayed image changes to that shown in FIG. 10A.

The area 61 in FIG. 10A and the area 62 in FIG. 10B indicate areas to make the contact determination. The contact determination is made using a part corresponding to the full screen of the picked-up image, when the image shown in FIG. 10A is displayed. The contact determination is made using a part corresponding to the area 62 displaying the key icons, when the image shown in FIG. 10B is displayed. In a displayed image, the light intensity in white-colored parts is higher than the light intensity of the other parts, and has influence on the amount of received light in the sensing elements 12 due to reflected light in the interface of the protective screen 13. For this reason, an incorrect detection may occur in finding a coordinate of contact position of an object. Against this background, by limiting the area to make the contact determination to the area 62 where influence of the displayed image is smaller, the contact determination can be made unaffectedly by the displayed image. Designation of the area for making the contact determination is not limited to the above-mentioned lower region of the display screen. For example, an inner side of a rectangular area smaller than the whole region of the display screen may be designated. In contrast, an outer region of the rectangular region may be selected, to designate a region in which operation keys such as icon selection, magnification/minification and paging, are arranged.

In a case where the intensity of ambient light is high, it is preferable that an image color of low transmissivity be used for the area 62. In this way, the intensity of the reflected light on the protective screen becomes low. Meanwhile, in the case where the intensity of ambient light is low, it is preferable that an image color of high transmissivity be used for the area 62. In this way, the intensity of the reflected light on the protective screen becomes high. These two modes can be switched as appropriate.

As has been described, according to the first embodiment, the area to make the contact determination is varied in response to the image displayed on the liquid crystal panel 1. Thus, the influence of the displayed image is suppressed, so that detection of the coordinate of contact point by use of a picked-up image can be made more accurately.

In addition, the display apparatus of the first embodiment includes the illuminance measurement unit 6. Accordingly, the method of the contact determination can be varied depending on the intensity of ambient light, to result in a broader range of ambient light under which the detecting of the coordinate of contact point can be done.

Moreover, the display apparatus of the first embodiment includes the backlight control unit 3 for controlling the light intensity of the backlight 2. With this backlight control unit 3, the light intensity of the backlight 2 can be lowered when the light intensity of ambient light is low, to avoid unnecessary brightness of the display screen. At the same time, the influence of the displayed image reflected in the picked-up image can be reduced, and accurate detection can be made for the coordinate of contact point even when the light intensity of ambient light is low.

Furthermore, in the display apparatus of the first embodiment, the protective screen 13 is adhered to the polarizer 16 by the adhesive agent 18 of the same refractive index as the protective screen 13. Hence, light reflection in the interface of the protective screen can be suppressed, so that influence from the displayed image being reflected in the picked-up image can be reduced. This makes it possible to detect the coordinate of contact point more accurately, even in ambient light of low intensity.

Second Embodiment

Figure 11:
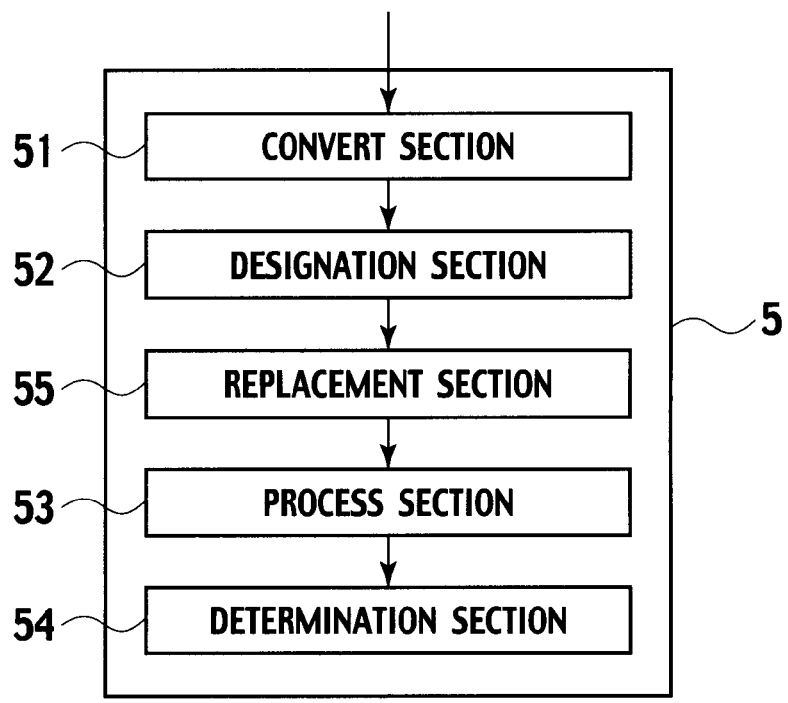
FIG. 11 is a plan view showing a configuration of an image process unit of a second embodiment.

As can be seen in FIG. 11, the display apparatus of a second embodiment includes a replacement section 55 in addition to the image process unit 5 of the first embodiment shown in FIG. 7. Before calculating a coordinate of an object adjacent to the display screen or executing a contact determination process, the replacement section 55 sets an area 71 of a picked-up image in FIG. 12 solid with the median value of the picked-up image. Here, the area 71 indicates the area other than an area 72 that is a target for the contact determination. In this way, the influence of the displayed image can be suppressed even when the brightness and darkness of the displayed image is reflected in the picked-up image.

Apart from the image process unit 5, the configuration of the display apparatus in this embodiment is the same as that of the first embodiment.

Figure 13:
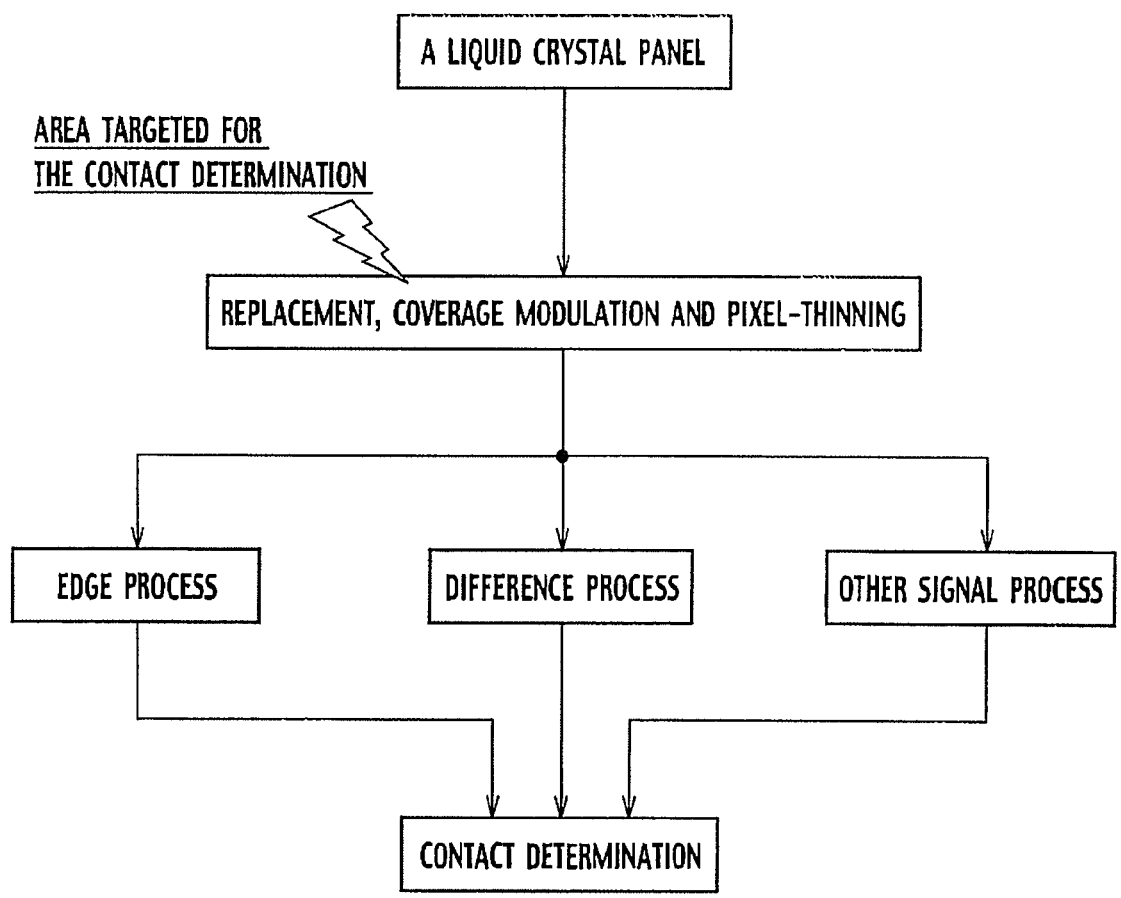
FIG. 13 is a flowchart showing the procedure of a coordinate calculation and the contact determination by the display apparatus of the second embodiment.

Next, descriptions will be provided for the coordinate calculation and contact determination executed in the image process unit 5. As can be seen in FIG. 13, the amount of received light detected in a liquid crystal panel 1 is inputted to the image process unit 5 and is converted by a convert section 51, so that an image expressed in the gradation value is obtained. Subsequently, a designation section 52 designates the area 72 targeted for the contact determination, out of the picked-up image. The replacement section 55 sets the area 71 of the picked-up image that does not require the contact determination solid with the median value of the gradation of the picked-up image. This process is executed in reference to coordinate information indicating the area 72 designated by the designation section 52. A process section 53 applies area coverage modulation and pixel-thinning to this image.

Subsequently, the process unit 53 applies an edge process, difference process and other signal processes to this image including the solid area. Since the images to which these processes of the process section 53 are applied have the solid area 71, the processes are applied to each image as a whole, regardless of the area targeted for the contact determination. Thereafter, in reference to the results of the processes, a determination section 54 makes a determination on the coordinate and contact point.

As has been described above, the influence of the displayed image can be suppressed by setting the area 71 solid with a predetermined gradation value. Even when the position, size and form of the area 72 are changed, the number of pixels in the vertical and horizontal direction in the image to be processed does not change. Consequently, the necessity is eliminated for the coordinate information on the target area for contact determination. In other words, it suffices that a single procedure is used for the signal processes regardless of the number of pixels. Thus, the size of various signal process circuits can be kept from growing large.

By setting the area 71 solid with the median value of the picked-up image, the influence of the signal process can be suppressed even when the gradation value of the picked-up image is particularly small or large. Note that the mean value may be used instead of the median value.

Figure 12:
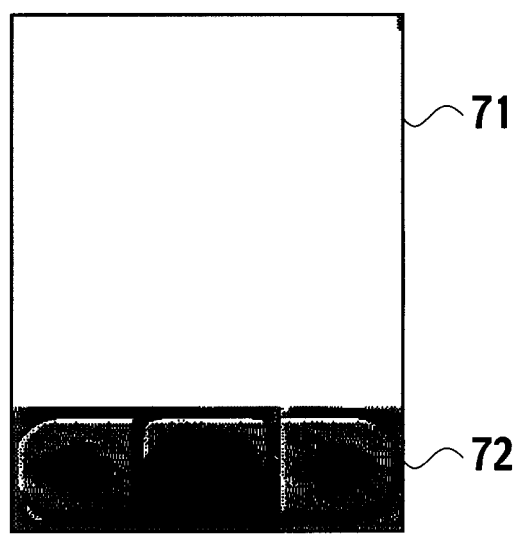
FIG. 12 is a picked-up image in which an area not targeted for the contact-determination range is set solid with a predetermined gradation value, in the display apparatus of the second embodiment.

Designation of the area for making the contact determination is not limited to the lower region of the display screen as shown in FIG. 12. For example, an inner side of a rectangular area smaller than the whole region of the display screen may be designated. In contrast, an outer region of the rectangular region may be selected, to designate a region in which operation keys such as icon selection, magnification/minification and paging, are arranged.

Thus, according to the second embodiment, a region out of the picked-up image is set solid with the median value of the image gradation used in the picked-up image. Specifically, this region is the part not targeted for the coordinate calculation and contact determination, designated in accordance with the displayed image. In this way, since the influence of the displayed image can be avoided, the coordinate of contact point according to the picked-up image can be more accurately detected. Additionally, since the size of the image targeted for the process does not change, it suffices that a single procedure is used for the signal processing. Thus, the size of various signal process circuits can be kept from growing large.

Third Embodiment

Figure 14:
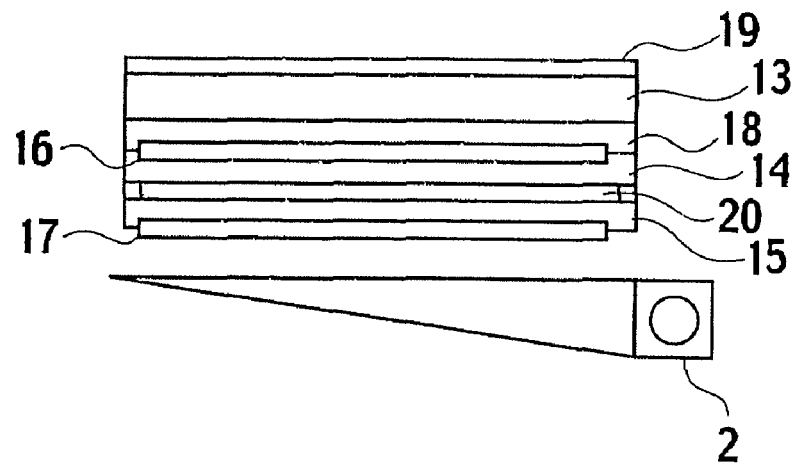
FIG. 14 is a cross-sectional view showing a configuration of the display apparatus according to a third embodiment.

As can be seen in FIG. 14, in a third embodiment, an anti-reflection layer 19 is provided to the protective screen 13 of the display apparatus according to the first embodiment. This configuration makes it possible to avoid the brightness and darkness of the displayed image to be reflected in the picked-up image. Moreover, the configuration also contributes to preventing reflection on the protective screen 13 that inhibits clear view of the display screen. The anti-reflection layer 19 is formed of a multi-layer film of inorganic insulation films, for example.

Fourth Embodiment

Figure 15:
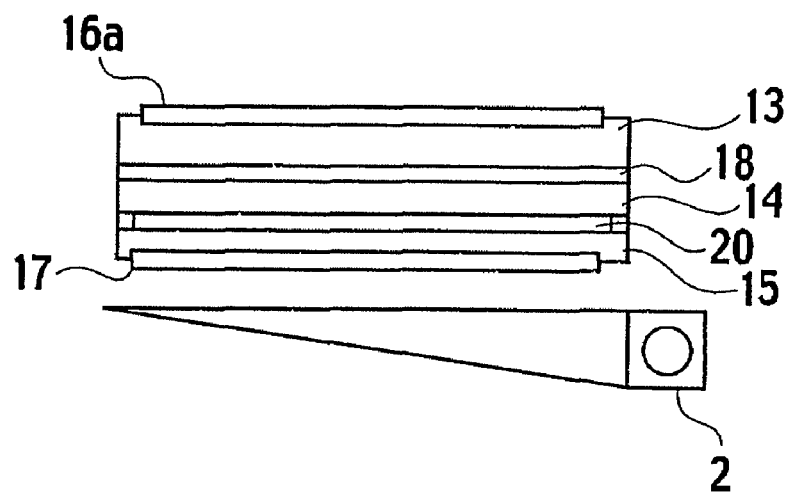
FIG. 15 is a cross-sectional view showing a configuration of the display apparatus according to a fourth embodiment.

As can be seen in FIG. 15, in a fourth embodiment, a polarizer 16a with anti-reflection means applied thereto is disposed on an outer side of the protective screen 13 of the display apparatus according to the first embodiment. Moreover, in this display apparatus, the protective screen 13 and the counter substrate 14 are adhered to each other by an adhesive agent 18. This configuration makes it possible to avoid the brightness and darkness of the displayed image to be reflected in the picked-up image. Moreover, the configuration also contributes to preventing reflection on the protective screen 13 that inhibits clear view of the display screen.

What is claimed is:

1. A display apparatus comprising:
   a display unit configured to display an image having a part that an object contacts;

a plurality of optical input units disposed in the display unit and configured to output electric signals in a magnitude corresponding to an amount of received light;

a convert unit configured to receive the signals from each optical input unit and convert the signals into gradation values to obtain a picked-up image;

a designation unit configured to designate an area in the picked-up image corresponding to the part;

a process unit configured to find a coordinate of the object in accordance with data within the designated area of the picked-up image; and a replacement unit configured to replace a region other than the designated area in the picked-up image, with a predetermined gradation value that is a median value of the gradation in the picked-up image.

* * * * *